United States Patent
Sadhasivam et al.

(10) Patent No.: US 7,082,477 B1
(45) Date of Patent: Jul. 25, 2006

(54) VIRTUAL APPLICATION OF FEATURES TO ELECTRONIC MESSAGES

(75) Inventors: Karthik M. Sadhasivam, Sunnyvale, CA (US); Eric M. Trehus, San Jose, CA (US); Anders K. Fung, Union City, CA (US); Bin Liang, San Jose, CA (US); Nicholas R. Leavy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 10/136,203

(22) Filed: Apr. 30, 2002

(51) Int. Cl.
*G06F 15/16* (2006.01)
(52) U.S. Cl. .................... 709/246; 370/392; 370/395.6
(58) Field of Classification Search ................ 709/246, 709/247, 206, 207; 370/392, 395.6
See application file for complete search history.

(56) References Cited

U.S. PATENT DOCUMENTS

| | | | |
|---|---|---|---|
| 6,253,321 B1 * | 6/2001 | Nikander et al. | 713/160 |
| 6,907,042 B1 * | 6/2005 | Oguchi | 370/412 |
| 2002/0133608 A1 * | 9/2002 | Godwin et al. | 709/230 |
| 2003/0074473 A1 * | 4/2003 | Pham et al. | 709/246 |
| 2003/0193949 A1 * | 10/2003 | Kojima et al. | 370/392 |

OTHER PUBLICATIONS

Phillip Rogaway et al., "A Software-Optimized Encryption Algorithm," Dept. Computer Science, Univ. Calif. at Davis, Sep. 18, 1997.

B. Schneier et al., "Cryptographic Support for Secure Logs on Untrusted Machines," Proc. Seventh USENIX Security Symposium, USENIX Press, Jan. 1998, pp. 53-62.

S. Kent et al., "Security Architecture for the Internet Protocol," IETF Request for Comments (RFC) 2401, The Internet Society, Nov. 1998.

S. Kent et al., "IP Authentication Header," IETF Request for Comments (RFC) 2402, The Internet Society, Nov. 1998.

S. Kent et al., "IP Encapsulating Security Payload (ESP)," IETF Request for Comments (RFC) 2406, The Internet Society, Nov. 1998.

(Continued)

*Primary Examiner*—Rupal Dharia
*Assistant Examiner*—Chirag R Patel
(74) *Attorney, Agent, or Firm*—Hickman Palermo Truong & Becker, LLP

(57) ABSTRACT

A method and apparatus for virtual application of features to electronic messages is disclosed. When a device applies a set of features to an electronic message, one or more of the features may be virtually applied instead of actually applied. For example, instead of encrypting a payload portion of a packet and adding an encryption header, the packet may not be encrypted. However, an appropriate encryption header may still be included in the packet such that the packet appears to have been encrypted when other features are applied. Prior to sending the packet, the payload portion is actually encrypted, such as by using a hardware accelerator. Some implementations may use a dual processor router, in which the input/output processor controls the hardware accelerator, the routing processor performs the virtual application of a feature, and prior to sending the packet the input/output processor actually applies the virtually applied feature.

22 Claims, 7 Drawing Sheets

OTHER PUBLICATIONS

D. Harkins et al., "The Internet Key Exchange (IKE)," RFC 2409, The Internet Society, Nov. 1998.

H. Orman, "The OAKLEY Key Determination Protocol," RFC 2412, The Internet Society, Nov. 1998.

Cisco Systems, "VPN Acceleration Module for Cisco 7200 and 7100 Series Routers," Aug. 2001, 4 pages.

Cisco Systems, "Cisco VPN Routers, Setting the Standard in Site-to-Site VPN Solutions," Aug. 2001, 4 pages.

Cisco Systems, "Cisco 7100 Series VPN Router, An integrated enterprise VPN router for deploying self-healing, self defending VPNs," Nov. 2001, 6 pages.

Cisco Systems, "Enhanced VPN Acceleration for Cisco 7100 Series VPN Routers," Nov. 2001, 2 pages.

Cisco Systems, "Integrated Services Adapter (ISA)," Mar. 2000, 6 pages.

Cisco Systems, "Integrated Services Module (ISM)," Nov. 1999, 6 pages.

* cited by examiner

| FAKE HEADER N 552 | FEATURE CONTEXT N 554 | FAKE HEADER B 556 | FEATURE CONTEXT B 558 | FAKE HEADER A 560 | FEATURE CONTEXT A 562 | PAYLOAD 518 |

| FAKE HEADER R 580 | FEATURE CONTEXT R 584 | FAKE HEADER S 586 | FEATURE CONTEXT S 588 | FAKE HEADER X 590 | FEATURE CONTEXT X 592 | PAYLOAD 518 |

VIRTUAL APPLICATION OF FEATURES TO ELECTRONIC MESSAGES

FIELD OF THE INVENTION

The present invention generally relates to application of features to electronic messages, and more specifically, to virtual application of features to electronic messages.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Modern communication networks use devices known as "routers" to direct network traffic between sources and destinations at Layer 3 of the Open System Interconnection (OSI) model. Typically, the router forwards electronic messages in the form data packets according to a routing protocol, such as the Internet protocol (IP). Based on the routing protocol and routing tables, the router reads the address information in each packet, decides the next routing point (the "next hop") to which to send the packet, and places the address of the next routing point in the destination address field of the packet's header. The process of changing the destination address of the packet and forwarding the packet to the next routing point is referred to as "packet switching." The next routing point may be the final destination for the packet or an intermediate destination on a path to the final destination.

Routers may be used within local area networks (LANs) to perform a variety of functions other than packet switching, including but not limited to, load-balancing network traffic, performing policy management, and filtering traffic for security purposes. Routers may also be used to send packets between networks, such as between a LAN and a wide area network (WAN), or between an enterprise's intranet and the world-wide global packet based network known as the Internet. Routers are also used in the backbone of the Internet to perform packet switching.

A router may apply one or more "features" to a packet. As used herein, the term "feature" denotes functions or processes that are used to alter one or more characteristics of the packet based on one or more operations. For example, compression is a feature that is used to reduce the size of the payload portion of a packet according to a compression technique. The original payload is input to the compression technique to generate a smaller payload as output. Upon receipt of a compressed packet, a reverse compression feature can be used to restore the original payload. Another example of a feature is encryption, which may be required to be applied for packets between two routers, such as in a virtual private network (VPN). The sending router uses an encryption feature to encrypt some or all of the packet and the receiving router uses a decryption feature to decrypt the encrypted packet, thereby restoring the packet to the original form prior to encryption. Other examples of features include, but are not limited to, load balancing, applying quality of service (QoS) policies, and filtering for security.

An example of an encryption approach used by some networks to secure traffic is the Internet Protocol security architecture (IPsec or IPSec), as defined in RFCs 2401, 2402, and 2406, which is often used with VPNs. IPsec uses security associations (SA's) that specify the parameters to be used to secure the IPsec traffic. IPsec operates in one of two modes, transport mode or tunnel mode, using one of two protocols, Encapsulating Security Payload (ESP) or Authentication Header (AH). ESP secures data that follows the ESP header, while AH secures both data that follows the AH header and the IP header that is before the AH header. A transport mode security association is an SA between two hosts. A transport mode security protocol header (either ESP or AH) appears immediately after the IP header and before any higher layer protocols (e.g., transmission control protocol (TCP) or user datagram protocol (UDP)). A tunnel mode security association is an SA that is applied to an IP tunnel. Whenever either end of a security association is a security gateway, the SA is a tunnel mode SA.

IPsec uses Security Parameter Index (SPI) values to identify the SA used for the secured traffic between two nodes, such as between two routers over a VPN. The SA defines the encryption protocols, keys, and other parameters relating to the IPsec secured traffic. The SPI for each node is determined during the second phase of the Internet Key Exchange (IKE) portion of the IPsec protocol as the SA is negotiated between the two IPsec nodes.

Conventionally, a router employs a single processor that applies a set of features to the packets and performs packet switching. However, a recent development in router design is the use of multiple processors for a router, in which the multiple processors share the workload that is conventionally performed by a single-processor router. For example, a dual-processor router implementation may attempt to evenly divide the routing workload between the two processors by designating some routing functions and features to be handled by one processor, with the remaining functions and features handled by the other processor. Each processor may be configured to efficiently handle the particular tasks and features that are handled by that processor.

Another recent development in router design is the concept of distributed features, in which the tasks for a particular feature are divided between multiple processors. For example, in a dual-processor router, the encryption feature may be distributed such that one processor is responsible for decryption while the second processor is responsible for encryption. Either or both processors may use additional hardware devices, such as compression accelerators and encryption accelerators, to apply compression and encryption features, respectively. However, in some dual-processor router implementations, only one processor controls or accesses the additional hardware devices. For example, in a dual-processor router that employs distributed encryption in which one processor is responsible for decryption and the other processor is responsible for encryption, only one of the two processors is allowed to control and access the encryption accelerator.

The use of distributed feature processing with hardware accelerators that are controlled by one processor in a multiple processor system can lead to performance problems. For example, the processor performing encryption may not be able to directly access the encryption accelerator because the processor that performs decryption is the only processor that is allowed to control and access the encryption accelerator. Therefore, all traffic between the encryption processor and the hardware processor must be routed through the other processor that handles decryption. In addition, the processor that cannot directly access the accelerator must interrupt processing the features for the packet until the encryption accelerator has completed the encryption task and passed the results back through the other processor.

FIG. 1 is a block diagram that depicts a dual-processor router 100 that uses hardware acceleration. Dual-processor router 100 includes a routing processor 120, an input/output processor 130, an input interface 140, an output interface 150, and a hardware accelerator 160. Note that while dual-processor router 100 is depicted as including all the elements discussed herein, one or more elements may be provided by other devices that are separate from dual-processor router 100, such as a separate hardware accelerator device. Furthermore, additional elements may be included in dual-processor router 100 and single elements depicted in FIG. 1 may be distributed over multiple elements.

Assume for this example that the workload of the single processor of a conventional router has been divided between routing processor 120 and input/output processor 130 of dual-processor router 100 as follows: routing processor 120 handles the switching of packets and applies some features to the packets, and input/output processor 130 handles input and output functions of dual-processor router 100 and applies other features to the packets.

Packets are received by dual-processor router 100 via input interface 140 that is communicatively coupled to input/output processor 130. After packets are passed from input interface 140 to input/output processor 130, some inbound features are applied to the packet by input/output processor 130 and then the packet is passed to routing processor 120 for applying additional features and switching the packet. After routing processor 120 is finished, the packet is passed back to input/output processor 130 to apply outbound features before passing the packet to output interface 150 that passes the packet out of dual-processor 100. Note that while input/output processor 130 is communicatively coupled to input interface 140, output interface 150, and hardware accelerator 160, routing processor 120 is only communicatively coupled to input/output processor 130.

In this example, dual-processor router 100 employs encryption in a distributed fashion, such that input/output processor 130 performs decryption on incoming packets that are received by dual-processor router 100 and routing processor 120 performs encryption and encryption parameter negotiation. While each processor of dual-processor router 100 performs these respective tasks of the encryption feature, both processors use hardware accelerator 160 for decryption and encryption of packet payloads.

When routing processor 120 needs to use hardware accelerator 160 for encryption, the performance problems arise because routing processor 120 cannot directly access hardware accelerator 160. Instead, any communication and data that is sent between routing processor 120 and hardware accelerator 160 passes through input/output processor 130. In addition, processing of the packet by routing processor 120 is interrupted while the necessary information is passed via input/output processor 130 and is processed by hardware accelerator 160.

One approach to solve this performance problem is to have input/output processor 130 perform both encryption and decryption. However, this defeats the distributed feature processing approach because the encryption feature is no longer distributed. Furthermore, even if the features are not distributed between routing processor 120 and input/output processor 130, there may be some features assigned to routing processor 120 that use hardware accelerator 160 or additional accelerators not shown in FIG. 1. In such instances, either routing processor 120 must again work through input/output processor 130, or routing processor 120 must interface directly with the accelerators, which may not be as efficient as having a single processor perform all interface operations.

Based on the foregoing, it is desirable to provide improved techniques for applying features in a router. It is also desirable to have improved techniques for employing distributed feature processing in multiple processor computing systems that include a hardware accelerator that does not suffer from the disadvantages discussed above.

SUMMARY OF THE INVENTION

Techniques are provided for virtual application of features to electronic messages. According to one aspect, an electronic message is received at a first device, such as a router receiving a packet. The electronic message is associated with one or more features that are to be applied to the electronic message. While applying the one or more features to the electronic message, a particular feature is identified, such as an encryption feature or a compression feature. The particular feature is associated with a group of one or more operations that modify at least a portion of the electronic message, such as encrypting or compressing the payload portion of a packet. While applying the particular feature, data is associated with the electronic message. The data indicates that the group of one or more operations has been performed, although the group of one or more operations actually has not been performed. As a result, the particular feature may be described as having been "virtually applied" to the electronic message.

After the one or more features have been applied to the electronic message, a determination is made as to whether the data is associated with the electronic message. When the data is determined to be associated with the electronic message, the portion of the electronic message is sent to a second device to perform the group of one or more operations, such as encrypting or compressing the payload portion of the packet. The second device generates a modified portion of the electronic message, such as an encrypted or compressed payload. The modified portion of the electronic message is received from the second device and used to generate a modified electronic message, such as an encrypted or compressed packet that is sent from the router to the next routing point.

According to other aspects, the virtual application of features is performed using a single processor, dual processor, or a multiple processor device. For example, with a dual processor router, one processor may be designated as the input/output processor and is responsible for applying some features, performing input/output operations for the router, and controlling and accessing additional hardware, such as an encryption or compression accelerator device that may be included as part of the router. The other processor may be designated as the routing processor and is responsible for applying other features and performing packet switching. For a dual or multiple processor apparatus, some features may be distributed among two or more processors. For example, the input/output processor may be responsible for handling decryption of incoming packets while the routing processor may be responsible for handling encryption of outbound packets by negotiating the encryption parameters and virtually encrypting the packets.

In addition, the data that is associated with the feature that is virtually applied may be incorporated into the electronic message, stored in a storage device such as memory or a fixed disk, or a combination thereof. For example, an encryption header may be added to a packet as part of virtually applying an encryption feature by a routing processor, with the encryption header including the encryption parameters to be used later by an encryption accelerator device to encrypt the packet. The encryption header may include additional information that indicates the portion of the packet to be encrypted, such as an offset value from the end of the packet to the start of the packet portion to be encrypted. The encryption header may include other information that indicates the presence of additional encryption headers, as in the situation in which multiple encryption features are applied to the packet. The encryption protocol used may include the IPsec protocol as implemented for a VPN.

According to other aspects, the invention encompasses a computer-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which:

FIG. 5E is a block diagram that depicts a packet that includes multiple fake headers and feature contexts that are arranged from left to right, according to an embodiment;

FIG. 5D is a block diagram that depicts a packet that includes multiple fake headers and feature contexts that are arranged from right to left, according to an embodiment.

DETAILED DESCRIPTION OF THE INVENTION

Figure 1:
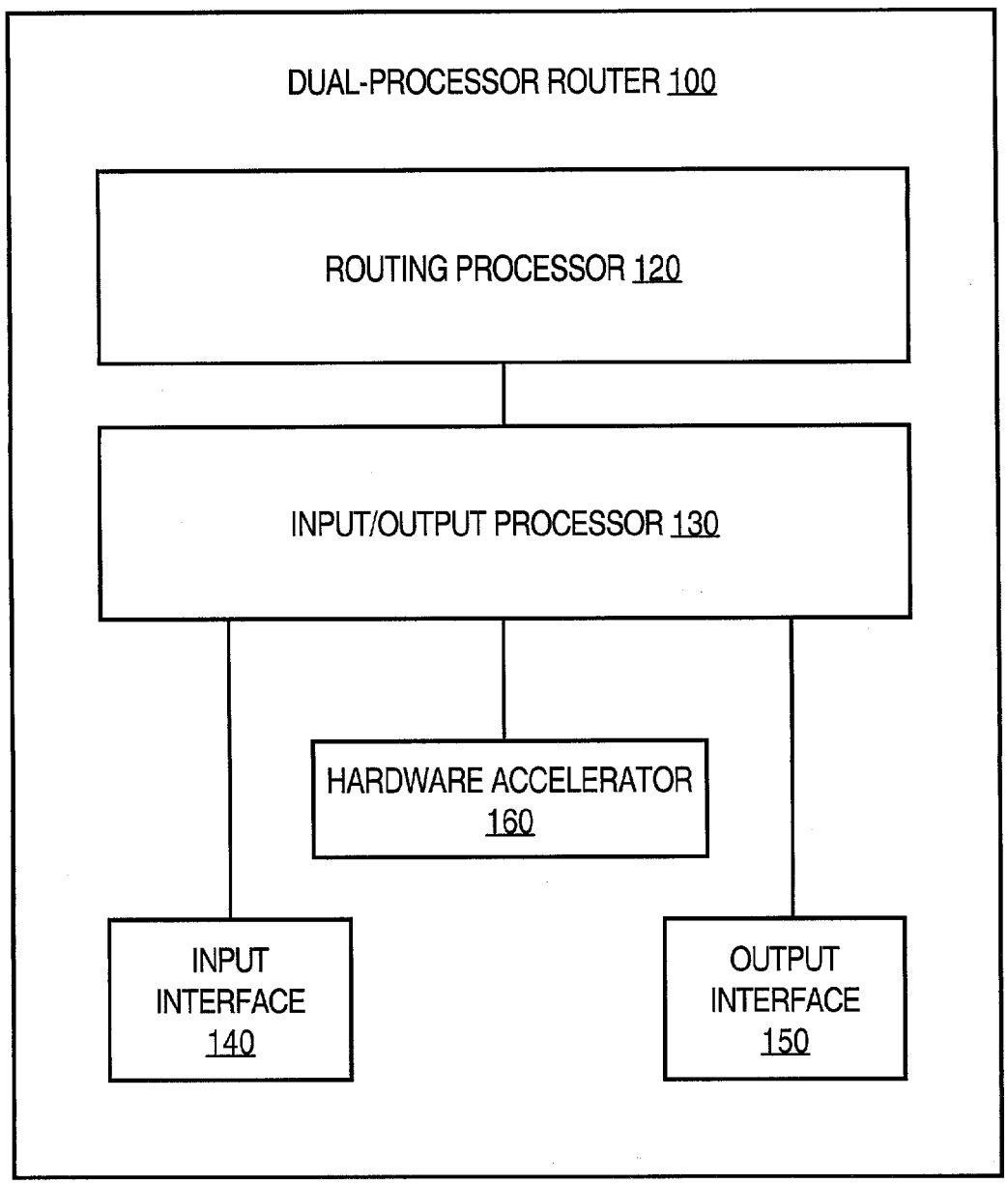
FIG. 1 is a block diagram that depicts a dual-processor router that uses hardware acceleration.

A method and apparatus for virtual application of features to electronic messages is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. FUNCTIONAL OVERVIEW
  A. Introduction
  B. Functional Overview of Virtual Application of a Distributed Feature
  C. Example of Actual Application of a Distributed Feature
II. FEATURES FOR ELECTRONIC MESSAGES
  A. Encryption and Compression
  B. Multiple Features
III. VIRTUAL APPLICATION OF A FEATURE
  A. Creating Data About the Feature Being Virtually Applied
  B. Associating the Data with the Electronic Message
    (1) Including the Data in the Electronic Message
    (2) Storing the Data Outside of the Electronic Message
    (3) Additional Approaches
IV. ACTUALLY APPLYING THE VIRTUALLY APPLIED FEATURE
  A. Determining Whether a Feature Has Been Virtually Applied
  B. Causing the Virtually Applied Feature to be Actually Applied
  C. Generating a Modified Electronic Message
V. TYPES OF PROCESSOR SYSTEMS
  A. Single Feature Processor Plus Hardware Processor
  B. Dual Feature Processors Plus Hardware Processor
  C. Multiple Feature Processors Plus Hardware Processor
VI. IMPLEMENTATION MECHANISMS
VII. EXTENSIONS AND ALTERNATIVES I. Functional Overview A. Introduction Techniques are provided for virtual application of features to electronic messages. According to one embodiment, instead of actually applying a feature to an electronic message, the feature instead is virtually applied. For example, instead of a router actually applying an encryption feature to a packet by sending the packet payload to an encryption accelerator when the encryption feature is normally applied, the router virtually applies the encryption feature without sending the packet payload to the encryption accelerator. The virtual application of the encryption feature includes creating and associating an encryption header with the packet that makes the packet appear to have an encrypted payload when in fact the payload has not been encrypted.

Later, after application of other features, the packet is examined to determine if a feature has been virtually applied. For example, the packet is examined to see if an encryption header is included that has a flag or other indication of the virtual application of the encryption feature. When a virtual application of a feature is identified, the feature is actually applied, such as by sending the payload of a packet to an encryption accelerator. After receiving the encrypted payload from the encryption accelerator, the proper headers are included with the encrypted payload to generate the final encrypted packet to be sent from the router.

As a result of virtual application of the encryption feature, router performance can be improved. For example, in dual-processor router 100 of FIG. 1, routing processor 120 can virtually encrypt a packet, thereby avoiding the extra traffic and associated overhead of having to work through input/output processor 130 to have hardware accelerator 160 encrypt the packet. As another example, the application of features by routing processor 120 is not interrupted when a feature requires the use of hardware accelerators, such as hardware accelerator 160 for performing encryption. Instead, input/output processor 130 applies such features later. Note that not all implementations and embodiments may include both or even either of these two improvements and may instead provide other performance changes.

B. Functional Overview of Virtual Application of a Distributed Feature

Figure 2:
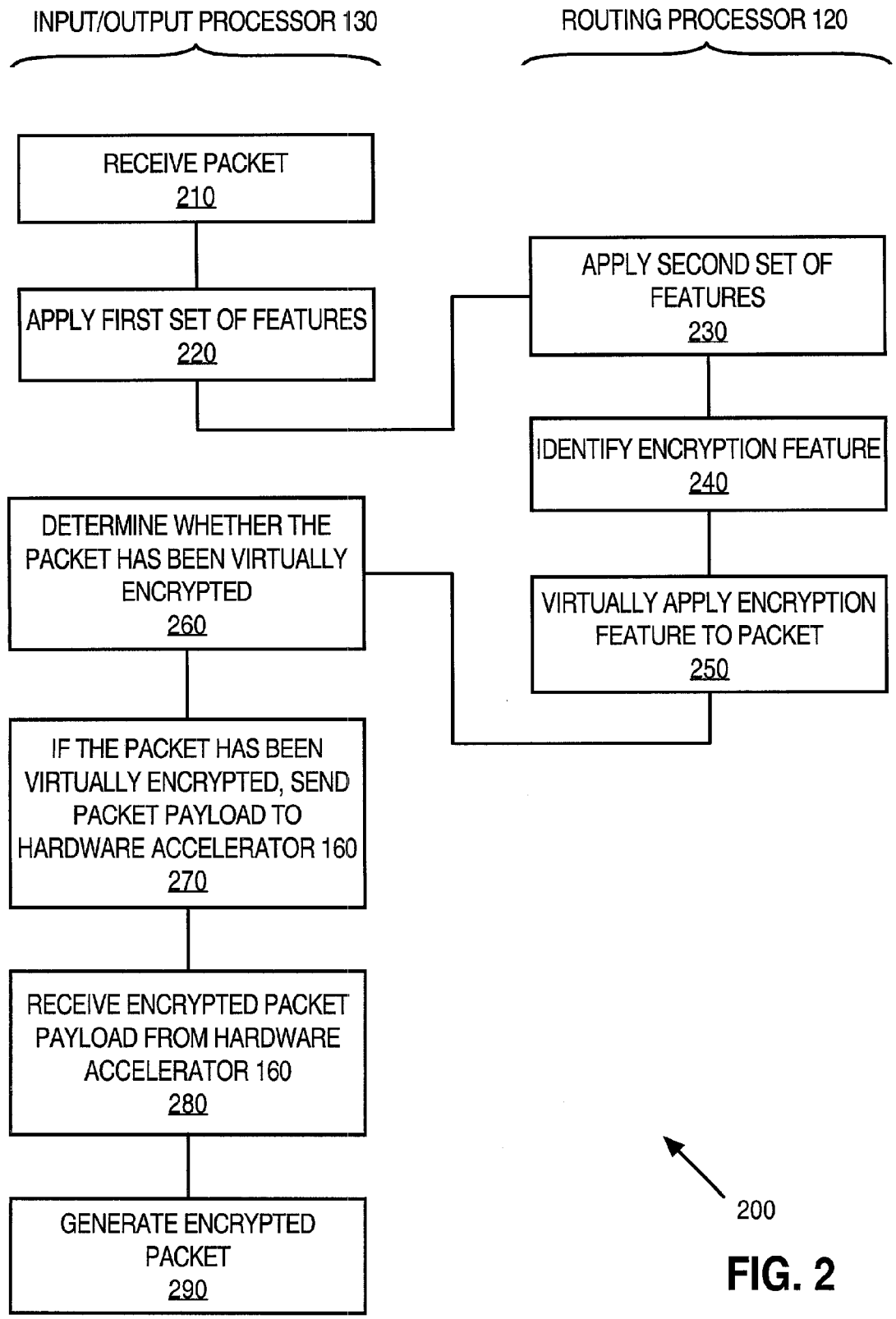
FIG. 2 is a flow diagram that depicts an overview of an approach for virtual application of features to electronic messages, according to an embodiment.

FIG. 2 is a flow diagram 200 that depicts an overview of an approach for virtual application of features to electronic messages, according to an embodiment. FIG. 2 is discussed with reference to dual-processor router 100 of FIG. 1 and a distributed feature implementation, such that routing processor 120 is responsible for encrypting packets, in addition to applying other features and performing packet switching, whereas input/output processor 130 is responsible for decrypting packets in addition to handling the input and output of dual-processor router 100. However, the approach of FIG. 2 is not limited to dual-processor and distributed feature implementations, and single processor and multiple processor implementations may be used along with non-distributed features.

For convenience, FIG. 2 is described in terms of virtual application of an encryption feature to a packet using dual-processor router 100 with distributed feature processing, although the approach is equally applicable to other features, to applying features in a non-distributed approach, to electronic messages in general instead of just packets, and to using either single processor or other multiple processor systems. While FIG. 2 depicts a particular series of steps in a particular order, steps may be added or omitted and the order changed from that as depicted in FIG. 2.

In block 210, input/output processor 130 receives a packet. The packet is associated with one or more features that are to be applied by dual-processor router 100. For purposes of explanation herein, assume that the one or more features include a first set of features to be applied by input/output processor 130 and a second set of features to be applied by routing processor 120.

In block 220, input/output processor 130 applies the first set of features, which may include one or more inbound features to apply to the packet, such as applying a QoS policy or uncompressing the packet's payload.

In block 230, routing processor 120 applies a second set of features. Routing processor 120 is responsible for performing packet switching for the packet, and the packet switching operations may be performed prior to, during, or after applying the second set of features. Multiple packet switching operations may be performed.

In block 240, routing processor 120 identifies an encryption feature while applying the second set of features. For example, the need for encrypting the packet may be identified after packet switching when routing processor 120 determines that the packet is to be sent over a VPN to another router using IPsec.

In block 250, routing processor 120 virtually applies the encryption feature to the packet. As used herein, the phrases "virtually applying a feature" and "virtual application of a feature" mean that a feature actually has not been applied, yet data is associated with the electronic message that makes the electronic message appear to have had the feature actually applied. For example, instead of encrypting a packet, the router "fakes" the encryption by generating an apparently valid encryption header, but without actually encrypting the payload portion of the packet.

As a specific example, the normal or actual application of the encryption feature would involve sending via input/output processor 130 the packet payload to hardware accelerator 160, receiving via input/output processor 130 the encrypted payload from hardware accelerator 160, and then incorporating the encrypted payload into the packet with an encryption header that includes the parameters necessary for the packet to be decrypted. In contrast, virtual application of the encryption feature by routing processor 120 as disclosed herein skips the exchange of the packet payload between routing processor 120 and hardware accelerator 160. Instead, routing processor 120 generates and includes in the packet an encryption header even though the packet is not encrypted. The encryption header includes the same encryption parameters as would be included in an encryption header following actual encryption, plus an additional value or flag that indicates that the encryption was virtually applied instead of actually applied. When routing processor 120 applies subsequent features to the packet, those features treat the packet as if the encryption had been actually performed, although the encryption has not been performed.

After routing processor 120 has applied all features in the second set of features, input/output processor 130 determines whether the packet has been virtually encrypted, as depicted by block 260. For example, input/output processor 130 inspects the packet for an encryption header, and then checks the encryption header for the value or flag that indicates that routing processor 120 virtually encrypted the packet.

In block 270, if input/output processor 130 has determined that the packet has been virtually encrypted by routing processor 120, input/output processor 130 sends the packet payload to hardware accelerator 160 for encryption. For example, part of the encryption header generated by routing processor 120 may include additional information that allows input/output processor 130 to determine the payload portion of the packet that is to be encrypted. The additional information may be in the form of an offset value from the end of the packet that indicates where the payload portion that is to be encrypted begins. The encryption header includes the encryption parameters necessary for hardware accelerator 160 to perform the encryption, such as IPsec parameters that identify the SA to be used and the SPI's of the origination and destination devices.

In block 280, input/output processor 130 receives the encrypted payload from hardware accelerator 160.

In block 290, input/output processor 130 generates the encrypted packet. For example, based on the encrypted payload portion received from hardware accelerator 160 in block 280, input/output processor 130 can include the original packet header information of the packet before the payload portion was sent to hardware accelerator 160. As a result, input/output processor 130 generates an encrypted packet to be sent from dual-processor router 100 that is the same as if the encryption feature had been actually applied by routing processor when applying the second set of features instead of virtually applying the encryption feature in block 250 and having the encryption actually performed later under the direction of input/output processor 130 in blocks 270 and 280.

C. Example of Actual Application of a Distributed Feature

While the example depicted in FIG. 2 focused on the virtual application of an encryption feature in which routing processor 120 is responsible for packet encryption, the following discussion focuses on both virtual application of the encryption portion of a distributed encryption feature and actual application of the decryption portion of the encryption feature, in which input/output processor 130 is responsible for actual application of the decryption portion of the distributed encryption feature.

Figure 3:
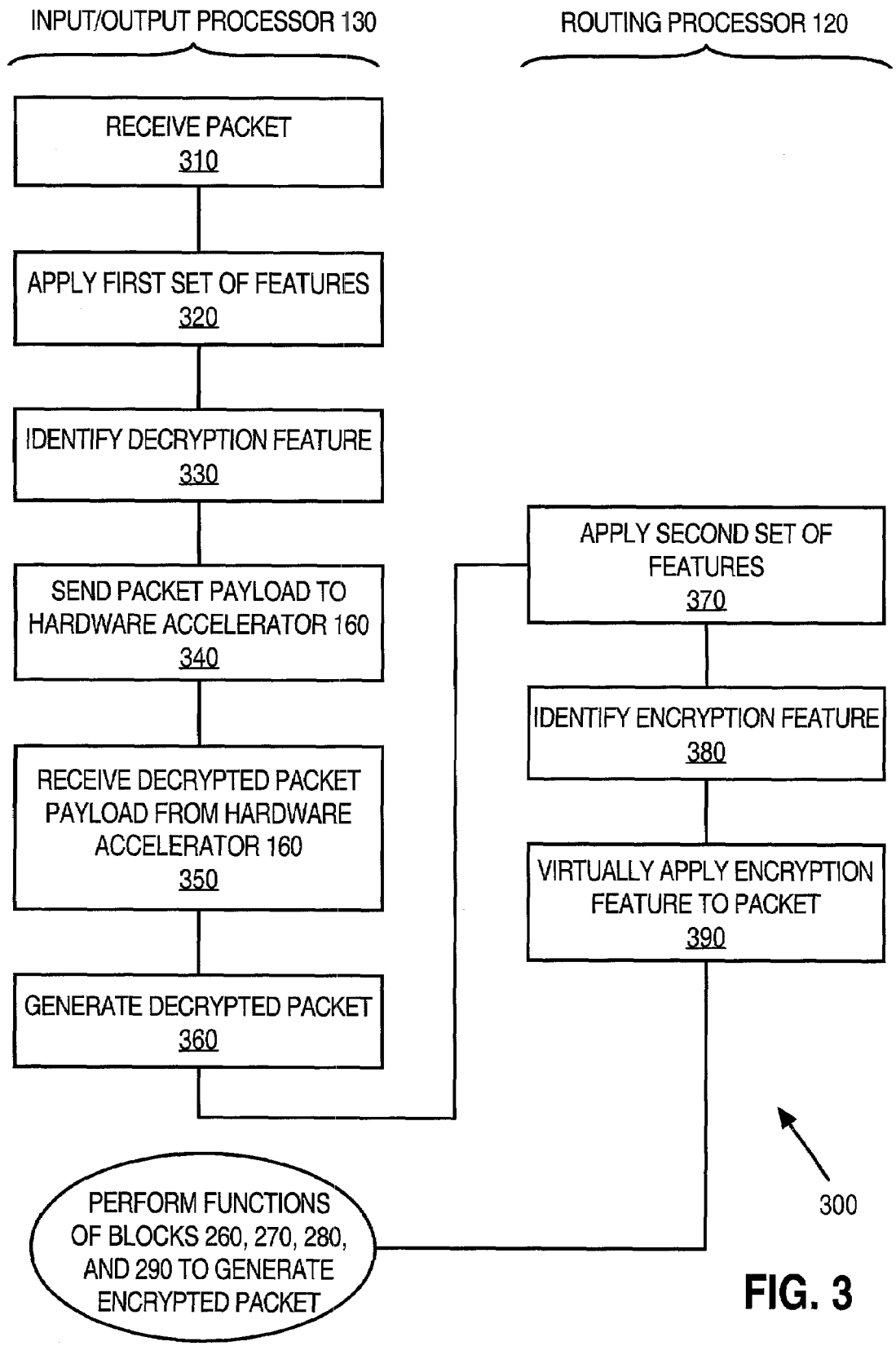
FIG. 3 is a flow diagram that depicts an overview of an approach for actual application and virtual application of different portions of a distributed feature to an electronic message, according to an embodiment.

FIG. 3 is a flow diagram 300 that depicts an overview of an approach for actual application and virtual application of different portions of a distributed feature to an electronic message, according to an embodiment. As with FIG. 2, FIG. 3 is discussed with reference to dual-processor router 100 of FIG. 1 and a distributed feature implementation, however, the approach of FIG. 3 is not limited to dual-processor and distributed feature implementations. Further, as with FIG. 2, the approach depicted in FIG. 3 is equally applicable to other features, to applying features in a non-distributed approach, to electronic messages in general instead of just packets, and to using either single processor or other multiple processor systems. While FIG. 3 depicts a particular series of steps in a particular order, steps may be added or omitted and the order changed from that of FIG. 3.

In block 310, input/output processor 130 receives a packet. The packet is associated with one or more features that are to be applied by dual-processor router 100. For purposes of explanation herein, assume that the one or more features include a first set of features to be applied by input/output processor 130 and a second set of features to be applied by routing processor 120.

In block 320, input/output processor 130 applies the first set of features. Input/output processor 130 is responsible for input and output operations for dual-processor router 100, including controlling and accessing hardware accelerators such as hardware accelerator 160 and handling the decryption portion of the distributed encryption feature.

In block 330, input/output processor 130 identifies the decryption portion of a distributed encryption feature while applying the first set of features. For example, the need for decrypting the packet may be identified after receipt of the packet based on identifying an encryption header in the packet.

In block 340, input/output processor 130 sends the packet payload to hardware accelerator 160 for decryption. For example, the encryption header in the packet that is identified by input/output processor 130 typically includes the necessary encryption parameters to decrypt the packet. If the packet were encrypted based on IPsec, the encryption parameters would include the SA and SPIs.

In block 350, input/output processor 130 receives the decrypted payload from hardware accelerator 160.

In block 360, input/output processor 130 generates the decrypted packet. For example, based on the decrypted payload portion received from hardware accelerator 160 in block 350, input/output processor 130 can include the original packet header information of the packet before the payload portion was sent to hardware accelerator 160. As a result, input/output processor 130 generates a decrypted version of the packet.

In block 370, routing processor 120 applies the second set of features, which can be performed in the same manner as discussed above for block 230. In block 380, routing processor 120 identifies an encryption feature while applying the second set of features. For example, even though the packet was encrypted after being received by input/output processor 130, dual-processor router 100 may not be the final destination for the packet and instead is a routing point on the path to the packet's final destination. Therefore, the packet may need to be encrypted, such as by using IPsec with a different SA, to send the packet to the next routing point or the final destination, whichever applies for the packet.

In block 390, routing processor 120 virtually applies the encryption feature to the packet, as described above for block 250.

Following block 390, input/output processor 130 performs the functions described above with reference to blocks 260, 270, 280, and 290 to generate the encrypted packet to be sent from dual-processor router 100 to the next routing point or final destination.

II. Features for Electronic Messages

The techniques described herein can be applied with a number of features, including but not limited to, encryption and compression. Furthermore, multiple applications of one or more features may be used.

A. Encryption and Compression

According to one embodiment, an encryption feature is virtually applied to an electronic message. The encryption feature may be implemented in either a distributed or non-distributed manner. For example, the encryption feature may be distributed between two processors of a two-processor router, such as dual-processor router 100, such that one processor handles decryption and the other processor handles encryption.

Both processors may use additional hardware, such as hardware accelerator 160, to perform bulk encryption and decryption operations, while the two processors of the two-processor router manage or administer the encryption and decryption functions. For example, one of the processors can be responsible for determining the encryption parameters to be used to encrypt the electronic messages and providing those parameters to the additional hardware and the other processor, as necessary. The additional hardware may be included as part of the same device that includes the one or more processors, or the additional hardware may be separate in another device that can perform the encryption and may perform additional functions.

As another example, the encryption feature may be non-distributed, such that a single processor handles both encryption and decryption, and the single processor may be the only processor in the router or may be one of a set of processors in the router.

While the examples herein are described using IPsec as the encryption protocol for encrypting and decrypting electronic messages, other encryption protocols and approaches may be used, including but not limited to, private key and public key approaches. For example, the Rivest-Shamir-Adleman (RSA) public key approach may be used, or the Data Encryption Standard (DES), Double DES, or Triple DES private key approaches may be used. For VPN's, IPsec can be used below the application level, or at the application level, the Secure Socket Layer (SSL) or Transport Layer Security (TLS) may be used.

According to another embodiment, a compression feature is virtually applied to an electronic message. As with encryption, compression may be distributed or non-distributed, with multiple processors separately handling compression and un-compression or a single processor performing both functions. Additional hardware accelerator devices may be used.

The additional hardware used in actually applying a feature may apply more than one type of feature. For example, a hardware accelerator may perform both encryption and compression. Also, more than one additional hardware device may be used, such as one hardware accelerator for encrypting packets and another hardware accelerator for decrypting packets.

B. Multiple Features

According to one embodiment, more than one feature is virtually applied to an electronic message. The multiple features may include multiple application of the same feature, such as multiple virtual encryptions of the packet, the virtual application of more than one type of feature to the same packet, such as both encryption and compression, or a combination thereof.

For example, one feature to be applied to a packet may involve using DES encryption, and therefore the router virtually applies DES to the packet. Another feature may involve using IPsec, such as to send the packet over a VPN, and therefore the router virtually applies IPsec to the packet that has already had DES virtually applied. As another example, one feature may involve compressing the packet, and another feature may involve encryption, and both the compression and encryption features may be virtually applied to the packet. The compression and encryption features may be virtually applied in separate operations, or both the compression and encryption feature may be virtually applied in the same operation.

Figure 4:
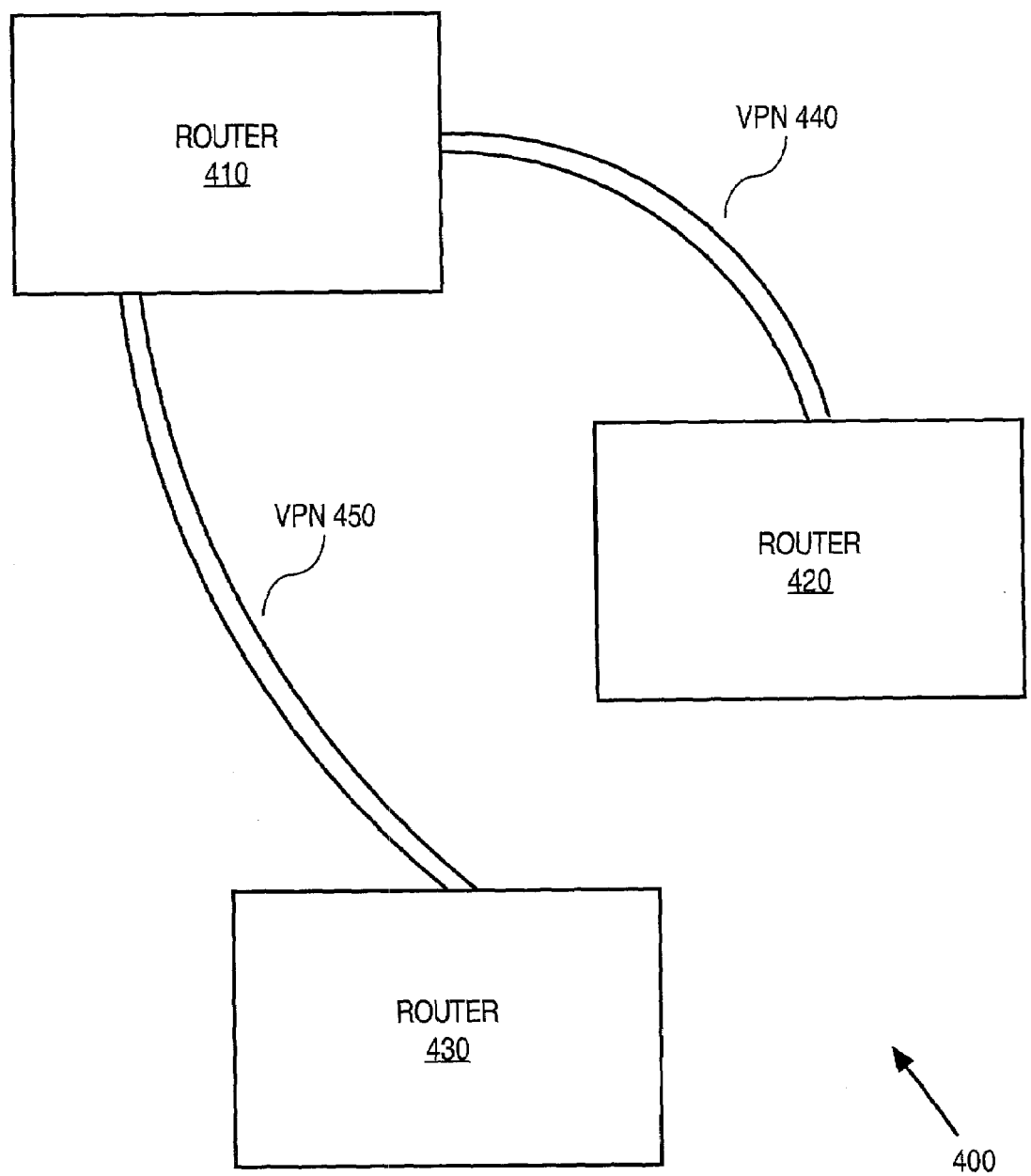
FIG. 4 is a block diagram that depicts multiple VPNs among a group of routers, according to an embodiment.

FIG. 4 is a block diagram 400 that depicts multiple VPNs among a group of routers, according to an embodiment. FIG. 4 depicts routers 410, 420, and 430, and VPNs 440, 450 that use IPsec. VPN 440 communicatively couples router 410 and router 420, and VPN 450 communicatively couples router 410 and router 430. When router 410 is to send the same packet to both router 420 and 430, router 410 can virtually apply IPsec encryption to the packet twice according to each SA for VPNs 440, 450.

III. Virtual Application of a Feature

According to one embodiment, the virtual application of a feature includes creating data about the feature and associating the data with the electronic message. For example, the data can include the information to perform the actual application of the feature. Also, the data can include information to identify that the feature has been virtually applied. Further, the data can include information to be used by other features that are subsequently applied to the electronic message.

A. Creating Data About the Feature Being Virtually Applied

When a feature is virtually applied to an electronic message, data about the feature is created. The data includes information necessary for the actual application of the feature. For example, if the feature is encryption, the data may identify the encryption parameters so that the electronic message can be encrypted. If IPsec is used for encryption along with a hardware accelerator, the data includes the SA and SPIs that have been negotiated between the router sending the packet and the router receiving the packet. Referring to the example described above with reference to FIG. 1 through FIG. 3, routing processor 120 negotiates the SA with the destination device for the packet. Therefore, routing processor 120 can include in the data the encryption parameters that routing processor 120 would have sent to hardware accelerator 160 if the packet was actually encrypted, instead of virtually encrypted.

Actual application of the virtually applied feature may use additional information besides the encryption parameters. For example, the data can include information that identifies which part of the packet is to be encrypted. For some encryption approaches, only the payload portion of the packet is encrypted, whereas for other encryption approaches, some or all of the header is encrypted along with the payload portion. As a particular example, an "offset" value may be included in the data that identifies the starting point of the packet portion to be encrypted using the end of the packet as a reference point to determine the location of the start of the packet portion. The offset value can be the number of bytes from the end of the packet to the start of the packet portion to be encrypted. As another example, a location value can be used that specifies the start of the packet portion to be encrypted with reference to the start of the packet.

In addition, the data includes information that can be used to determine whether a feature has been virtually applied. For example, a flag or other parameter may be specified to indicate that an encryption feature has been virtually applied to a packet, with a first specified value, such as one, indicating that the encryption feature has been virtually applied and another specified value, such as zero, indicating that the encryption feature has not been virtually applied.

Further, the data can include information about the feature that has been virtually applied that can be used by other features. For example, the data may specify that a compression feature has been applied, and information that indicates how effective or efficient the compression function was performed. For a virtually applied feature, the true information is not yet known because the electronic message actually has not been compressed. However, the compression effectiveness information can be created using one or more dummy values and included in the data, such that a subsequent feature that looks at such information can use the dummy values.

In general, the data can include any information, whether or not the information may or could be subsequently used by another feature or function. While using accurate and true information in the data can help prevent problems that might arise through the use of dummy values, there is no requirement that all the information be accurate or that all true information that is known be used. The data associated with the virtual application of a feature may be referred to as the "feature context" in general, or for particular features, by a more descriptive name such as "crypto context" for virtual encryption or "compression context" for virtual compression.

B. Associating the Data with the Electronic Message

The data for the virtually applied feature may be associated with the electronic message using one or more of a variety of approaches alone or in combination. Example approaches include, but are not limited to, including the data in the electronic message, sharing the data outside of the electronic message, and variations or combinations thereof.

(1) Including the Data in the Electronic Message

According to one embodiment, the data about the virtually applied feature is included in the electronic message. For example, if the electronic message is a packet, the packet can be modified to include the data that is created as described above, such as by including the data as an additional packet header, which is referred to herein for convenience as a crypto header.

Figure 5A:
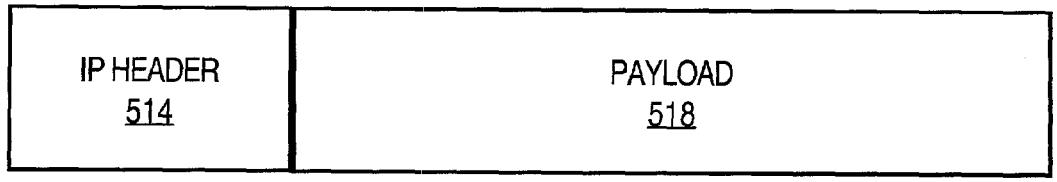
FIG. 5A is a block diagram that depicts a conventional Internet Protocol (IP) network data packet that includes an IP header and a payload.

FIG. 5A is a block diagram that depicts a conventional Internet Protocol (IP) network data packet 510 that includes an IP header 514 and a payload 518. IP header 514 typically includes control information, such as the origination and destination address of the packet, the type of packet, and the priority level for the packet. Payload 518 typically includes the contents or data being carried by packet 510, as compared to the control information, or overhead, of IP header 514.

Figure 5B:
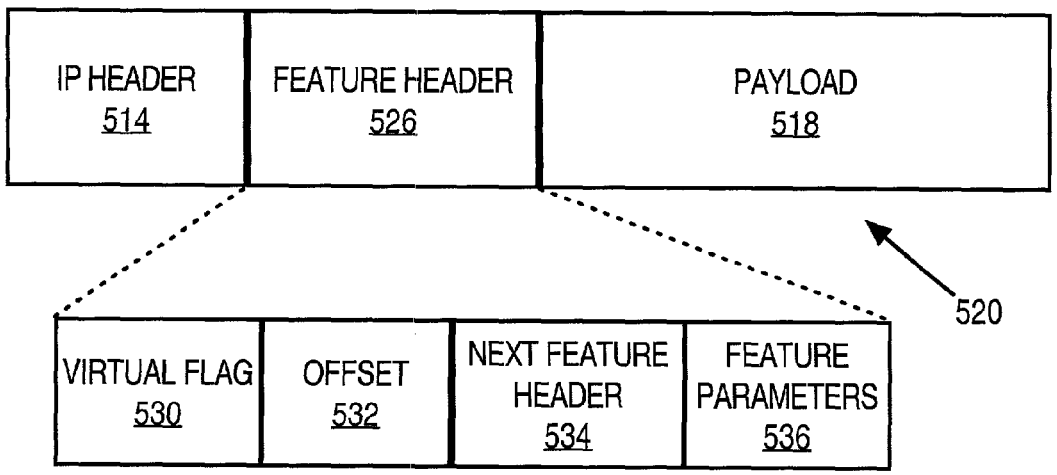
FIG. 5B is a block diagram that depicts a packet that includes a feature header for a virtually applied feature, according to an embodiment.

FIG. 5B is a block diagram that depicts a packet 520 that includes a feature header 526 for a virtually applied feature, according to an embodiment. Packet 520 includes IP header 514 and payload 518, which are unchanged from FIG. 5A. The inclusion of feature header 526 in packet 520 increases the length of packet 520 as compared to packet 510, which may be referred to as "growing" the packet. However, in other implementations, packet 520 may include a modified IP header or a modified payload that incorporate feature header 526 without the need to grow the packet.

Feature header 526 is depicted as including a virtual flag 530, an offset 532, a next feature header 534, and feature parameters 536. Virtual flag 530 can include the flag information value discussed above, which indicates whether or not the feature has been virtually applied. Alternatively virtual flag 530 may be an identifier, such as a flow identifier.

Offset 532 can include location information for the portion of the packet to which the feature is to later be actually applied. For example, offset 532 can specify the number of bytes from the end of the packet at which is found the start of the portion of the packet to be encrypted. The location specified by offset 532 may or may not correspond to the start of payload 518 of the original packet 510, depending on how much of the packet is to be encrypted as specified in the encryption approach to be applied.

Next feature header 534 specifies the start of another feature header, in the event that more than one feature is virtually applied. If only one feature is virtually applied, then the value of next feature header 534 is NULL, or the equivalent.

Next feature header 534 also can serve as a flag as to whether an additional feature has been virtually applied. For example, if the packet is virtually encrypted twice, each virtual encryption is associated with a different feature header. The first virtual encryption may be associated with feature header 534, and the second virtual encryption may be associated with another feature header that has been added between IP header 514 and feature header 526. Therefore, next feature header 534 points to the location at which the additional feature header begins, and the additional feature header typically includes the same types of information in the same format as feature header 526, although in some implementations the information and format between the feature headers may be different.

Feature parameters 536 include information to allow for the actual application of the feature. For example, if the virtual feature is encryption based on IPsec, feature parameters 536 can include the SA and SPIs for the VPN. Alternatively, feature parameters 536 can be in the form of an encryption header, such as an AH or ESP header, that would be created upon actual application of the feature, and therefore packet 520 can appear to other features and processes to have been encrypted when packet 520 actually has not been encrypted.

Other variations of the content and organization of feature header 526 may be used. For example, feature parameters 536 may be included at the start of feature header 526 and may be formatted as a typical encryption header, such as an AH or ESP header for IPsec that identifies the SA and SPIs for the VPN. Feature parameters 536 would then be followed by virtual flag 530, offset 532, and next feature header 534. Additional information may be included in feature header 526, or one or more of the information items depicted in feature header 526 may be omitted.

According to another embodiment, data about multiple virtually applied features is included in the electronic message. For example, each virtually applied feature may be associated with both a fake header and a feature context. The fake header may include information about the virtually applied feature to make it appear that the feature was actually applied and information that acts as a virtual flag to indicate that a feature was virtually applied. The feature context may include information for actually applying the feature, such as encryption parameters, and information that indicates where the next fake header is located, if there is another virtually applied feature.

FIG. 5D is a block diagram that depicts a packet 550 that includes multiple fake headers and feature contexts that are arranged from right to left, according to an embodiment. Packet 550 includes fake header N 552, feature context N 554, fake header B 556, feature context B 558, fake header A 560, feature context A 562, and payload 518. Fake header A 560 and feature context A 562 are created by virtual application of feature A, such as encryption. Fake header B 556 and feature context B 558 are created by virtual application of feature B, such as encryption. Fake header N 552 and feature context N 554 are created by virtual application of feature N, such as encryption. Thus, packet 550 has been virtually encrypted three times.

The fake headers and feature contexts for each of features A, B, and N are arranged from right to left based on the order in which features A, B, and N. Assume for the example depicted in FIG. 5D that feature A was applied first, then feature B, and then feature N. Because each of the three virtually applied features are encrypting the packet, the fake header and feature context is located to the left of the portion of the packet to be encrypted. For example, encryption feature A was the first feature to be virtually applied, and therefore fake header A 560 and feature context A 562 are located to the left of payload 518 since encryption feature A encrypts payload 518. Because encryption feature B was the next feature to be virtually applied, fake header B 556 and feature context B 558 are located to the left of fake header A 560 since encryption feature B encrypts the result of applying encryption feature A. Similarly, fake header N 552 and feature context N 554 are located to the left of fake header B 556 because encryption feature N was the last encryption feature to be virtually applied. Encryption features A, B, and N are actually applied in the same order in which encryption features A, B, and N were virtually applied.

FIG. 5E is a block diagram that depicts a packet 580 that includes multiple fake headers and feature contexts that are arranged from left to right, according to an embodiment. Packet 580 includes fake header R 582, feature context R 584, fake header S 586, feature context S 588, fake header X 590, feature context X 592, and payload 518. Assume for the example depicted in FIG. 5E that feature R was applied first, then feature S, and then feature X. Features R, S, and X may be actually applied in the same order in which features R, S, and X were virtually applied, namely feature R first, then feature S, and then feature X. One or more of features A, B, and N that are applied to packet 550 may be the same as one or more of features R, S, and X that axe applied to packet 580.

According to another embodiment, a feature context may include information for application of more than one feature. For example, the same hardware device may perform both encryption and compression, and therefore, feature context X 592 can include information for actually applying both the encryption feature and the compression feature.

(2) Storing the Data Outside of the Electronic Message

According to another embodiment, the data about the virtually applied feature is stored outside of the electronic message, and therefore the packet is not modified. For example, the data can be stored in a memory device, such as volatile memory space (e.g., RAM) or a persistent storage device (e.g., a fixed disk).

If a multiple processor router is used, such as dual-processor router 100, the stored data can be written to and read from the storage location. As a specific example, routing processor 120 can store the data in a shared memory address space for later retrieval by input/output processor 130. Whenever a packet is processed by input/output processor 130 after being processed by routing processor 120, input/output processor 130 can check the shared memory address space for a flag indicating the virtual application of a feature. If such a flag is found, input/output processor 130 can read the shared memory address space to obtain the other information in the date, such as that corresponding to offset 532, next feature header 534, and feature parameters 536.

(3) Additional Approaches

According to another embodiment, some of the information in the data about the virtually applied feature is included in the electronic message, while other information is stored outside of the electronic message. For example, a special header can be added to the start of a packet that includes a virtual feature flag while the remainder of the data is stored outside of the packet.

Figure 5C:
FIG. 5C is a block diagram that depicts a packet that includes a virtual flag that has been added to the beginning of the original packet, according to an embodiment.

FIG. 5C is a block diagram that depicts a packet 540 that includes a virtual flag 542 that has been added to the beginning of the original packet, according to an embodiment. For example, virtual flag 542 may be two bytes long, for storing a value that indicates whether or not a feature has been virtually applied to packet 540.

If dual-processor router 100 is being used, input/output processor 130 can be configured to check all packets from routing processor 120 for the value stored in virtual flag 542. After actually applying any virtually applied features, input/output processor can remove virtual flag 542 from packet 540 before sending packet 540 from dual-processor router 100. If input/output processor 130 determines that a feature has been virtually applied, the remaining data about the virtually applied feature can be accessed from the storage location outside of packet 540.

IV. Actually Applying the Virtually Applied Feature

According to one embodiment, a virtually applied feature is actually applied by determining whether the feature has been virtually applied, causing the virtually applied feature to be actually applied, and generating a modified electronic message based on the actual application of the feature.

For example, if routing processor 120 virtually applies an encryption feature and includes feature header 526 in packet 520, input/output processor 130 will actually apply the feature. By examining all packets from routing processor 120, input/output processor can determine whether one or more features have been virtually applied to each packet, and if so, cause the virtually applied feature to be actually applied, such as by using hardware accelerator 160 to encrypt payload 518. Upon receipt of the encrypted payload 518, input/output processor 130 can generate the encrypted packet to be sent from dual-processor router 100 based on encrypted payload 518 and IP header 514.

A. Determining Whether a Feature Has Been Virtually Applied

Determining whether a feature has been virtually applied is based on examining the data that is associated with the electronic message. As discussed above, the data may include information that is added to the packet, stored separate from the packet, or both. However, either the presence of the data itself or one or more values or other indicators within the data specifies whether or not a feature has been virtually applied.

For example, if routing processor 120 has virtually applied an encryption feature, input/output processor can examine the data that routing processor 120 associated with the electronic message to determine that the encryption feature was virtually applied. If routing processor included feature header 526 in packet 520, then input/output processor can examine all packets after routing processor 120 has applied the second set of features for the presence of feature header 526. If feature header 526 is found, then input/output processor 130 concludes that a feature was virtually applied by routing processor 120.

As another example, input/output processor 130 can examine all packets from routing processor 120 to determine the value stored in virtual flag 542 of packet 540. The value thus determined indicates whether or not routing processor virtually applied a feature (e.g., a "1" or other specified value indicates the virtual application of a feature whereas a "0" or other specified value indicates no virtual application of a feature).

As yet another example, if the data associated with virtual application of the feature is stored separate from the packet, input/output processor 130 can examine the stored information to determine whether routing processor 120 has updated the stored information to indicate that a feature has been virtually applied.

B. Causing the Virtually Applied Feature to be Actually Applied

After determining that a feature has been virtually applied, the feature is actually applied. For example, assume that routing processor 120 virtually encrypts packet 520 and includes feature header 526 so that input/output processor 130 can determine that the virtual encryption was performed based on the value of virtual flag 530. Input/output processor 130 examines offset 532 to determine the portion of packet 520 that is to be encrypted. Depending on the encryption approach being used, the portion generally includes at least payload 518 and perhaps an encryption protocol header, such as an AH or ESP header for the IPsec protocol. Furthermore, input/output processor 130 examines feature parameters 536 to determine the encryption parameters to be used to encrypt the identified portion of the packet.

After examining packet 520 to determine what part of packet 520 is to be encrypted and the associated encryption parameters, input/output processor 130 saves the other packet information for packet 520. For example, following the virtual encryption of packet 510 to create packet 520, additional features may have been applied by routing processor 120 or input/output processor 130 prior to performing the actual application of the feature that was virtually applied. The applications of such other features may change some of the information contained in the header of packet 520, such as IP header 514, or the features may have resulted in the addition of other headers or information to packet 520. Such information typically is not included in the portion of the packet to be encrypted by hardware accelerator 160.

Furthermore, when hardware accelerator 160 performs the encryption function, such information may be altered, yet the encrypted packet that is sent from dual-processor router 100 should include an unaltered form of that information. Therefore, the packet information for packet 520 that is not associated with the virtually applied encryption feature is saved by input/output processor 130, and such information may be referred to as the "packet context."

Input/output processor 130 then sends the portion of packet 520 that is to be encrypted to hardware accelerator 160, along with the encryption parameters from feature parameters 536. For example, input/output processor 130 can create a special packet with an encryption header for the packet portion to be encrypted, with the encryption header including the encryption parameters.

Hardware accelerator 160 then encrypts the portion of the packet and sends the encrypted portion back to input/output processor 130, such as in the form of an encrypted IP packet. For example, hardware accelerator 160 may send input/output processor 130 a packet that includes the encrypted portion of the packet, an encryption header that is consistent with the encryption protocol, and a standard IP header.

C. Generating a Modified Electronic Message

After receiving the encrypted portion of the packet from hardware accelerator 160, input/output processor generates the encrypted packet that is to be sent from dual-processor router 100. For example, the actually encrypted portion of the packet that is received from hardware accelerator 160 by input/output processor 130 may be separated from any other header information added by hardware accelerator 160. Input/output processor 130 then takes the encrypted portion of the packet and the other saved packet information, such as IP header 514, and creates the encrypted packet to be sent to the next routing point or destination. In general, the packet sent by input/output processor 130 is the same as would have been sent if routing processor 120 had actually applied the encryption feature instead of virtually applying the encryption feature.

V. Types of Processor Systems

While the embodiments and examples described herein generally are described in the context of dual-processor router 100 that includes two processors, a variety of different types of processor implementations may be used to implement the virtual feature techniques described here. For example, such implementations include, but are not limited to, a single processor approach, a dual-processor approach, and a multiple processor approach involving more than two processors.

A. Single Feature Processor Plus Hardware Processor

According to one embodiment, the techniques for virtual application of features described herein are implemented using a single processor for applying features and performing packet switching along with an additional hardware processor.

For example, a conventional single processor router may be used, and the router may include a hardware accelerator that includes a processor for performing encryption and compression. Although the single processor of the router for applying features typically is able to control and access the additional hardware accelerator, the use of virtual application of features can still be used to defer application of the virtually applied features.

B. Dual Feature Processors Plus Hardware Processor

According to another embodiment, the techniques for virtual application of features described herein are implemented using dual processors for applying features and performing packet switching along with an additional hardware processor.

For example, dual-processor router 100 of FIG. 1 is an example of a dual feature processor approach involving routing processor 120, input/output processor 130, and hardware accelerator 160.

As another example, a router may employ two processors, in which one is called the "VPN switch route processor (VSR)" and the other is called the "VPN input and output processor (VIO)." The VSR is responsible for handling encryption and packet switching, along with applying other features, and the VIO is responsible for handling decryption and input/output operations for the router, along with applying other features. The VSR and VIO use a "descriptor ring" that stores each packet in one or more descriptors, along with a "trailer" descriptor that denotes the end of a series of descriptors for a particular packet. The descriptor ring may be implemented using memory that is accessible by both the VSR and VIO, and therefore instead of passing packets back and forth between the VSR and VIO, reference information that identifies the descriptors for each packet are exchanged.

C. Multiple Feature Processors Plus Hardware Processor

According to another embodiment, the techniques for virtual application of features described herein are implemented using more than two processors for applying features and performing packet switching along with an additional hardware processor.

For example, instead of having a single VSR and a single VIO, a router may have more than one VSR, more than VIO, or more than one VSR and VIO. If more than one VSR or VIO is included in the router, each VSR or VIO may perform the same tasks, each VSR or VIO may perform different tasks, or each VSR or VIO may perform some different tasks and some of the same tasks.

As an example, if multiple VSRs are included in the router, one VSR may be responsible for applying the features and another VSR may be responsible for packet switching. The VSR responsible for feature application may virtually apply one or more features instead of actually applying the features, such as in the case of an encryption feature where encryption is performed by another processor, such as an encryption accelerator, that is accessed and controlled by a VIO.

As another example, if multiple VIOs are included in the router, one VIO may be responsible for input operations and applying inbound features, another for output operations and applying outbound features, and a third for applying other features, including the actual application of features that have been virtually applied by one or more VSRs. The VIO responsible for input operations and applying inbound features may handle decryption of incoming packets, such as in a manner as described above in reference to FIG. 3. The VIO responsible for actually applying the virtually applied features may do so in a manner such as that described with reference to FIG. 2.

VI. Implementation Mechanisms

The approach for virtual application of features to electronic messages described herein may be implemented in a variety of ways and the invention is not limited to any particular implementation. The approach may be integrated into a routing system or a router device, or may be implemented as a stand-alone mechanism. Furthermore, the approach may be implemented in computer software, hardware, or a combination thereof.

Figure 6:
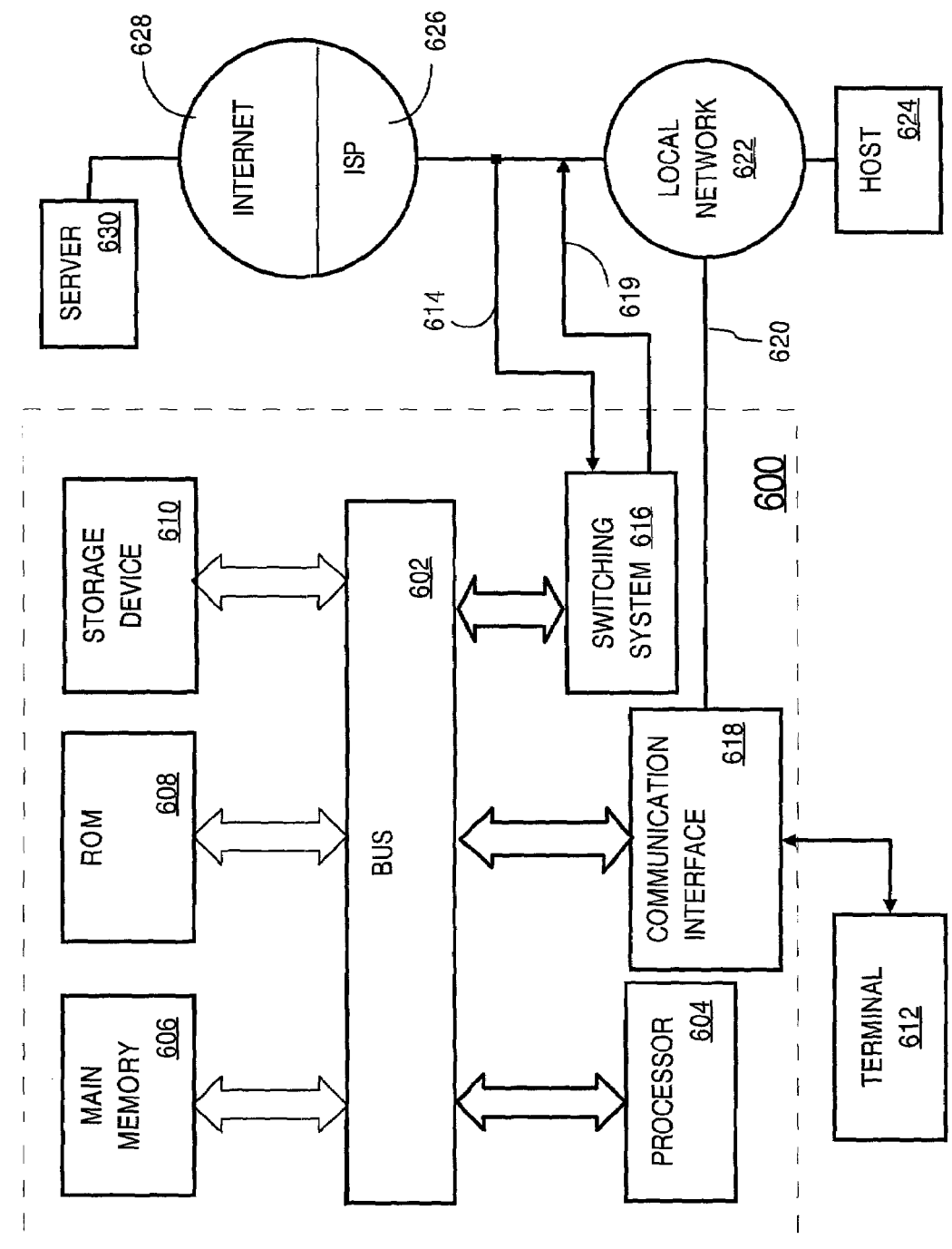
FIG. 6 is a block diagram that depicts a computer system upon which an embodiment may be implemented.

FIG. 6 is a block diagram that illustrates a computer system 600 upon which an embodiment of the invention may be implemented. One embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Communication interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for virtual application of features to electronic messages. According to one embodiment, the virtual application of features to electronic messages is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 625. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for virtual application of features to electronic messages as described herein.

The received code may be executed by processor 604 as it is received, and/or stored in storage device 610, or other non-volatile storage for later execution. In this manner, computer system 600 may obtain application code in the form of a carrier wave.

VII. Extensions and Alternatives

In the foregoing specification, the invention has been described with reference to specific embodiments thereof. It will, however, be evident that various modifications and changes may be made thereto without departing from the broader spirit and scope of the invention. For example, although examples have illustrated the use of a dual-processor router, the dual-processor router is used for explanation purposes only as an embodiment and the techniques herein are not limited to any particular type of processing system. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for virtual application of features to electronic messages, the method comprising the computer-implemented steps of:

receiving, at a first device, an electronic message that is associated with one or more features that are to be applied to the electronic message;

while applying the one or more features to the electronic message, identifying a particular feature of the one or more features that is associated with a group of one or more operations that modify at least a portion of the electronic message;

while virtually applying the particular feature, associating data with the electronic message, wherein the data indicates that the group of one or more operations has been performed, although the group of one or more operations actually has not been performed;

after associating the data with the electronic message, applying at least one feature of the one or more features other than the particular feature as if the group of one or more operations has been performed, even though the group of one or more operations actually has not been performed;

after applying the at least one feature of the one or more features, determining whether the data is associated with the electronic message;

when the data is determined to be associated with the electronic message, sending the portion of the electronic message to a second device to perform the group of one or more operations, thereby generating a modified portion of the electronic message based on the portion of the electronic message;

receiving from the second device the modified portion of the electronic message; and based on the modified portion of the electronic message, generating a modified electronic message.

2. A method as recited in claim 1, wherein:

the first device includes a first processor and a second processor;

the first processor performs the steps of receiving the electronic message, determining whether the data is associated with the electronic message, sending the portion of the electronic message to the second device, receiving from the second device the modified portion of the electronic message, and generating the modified electronic message; and the second processor performs the steps of identifying the particular feature and associating the data with the electronic message.

3. A method as recited in claim 1, wherein:

the particular feature is to encrypt at least the portion of the electronic message;

the data includes one or more encryption parameters; and the modified portion of the electronic message is generated by the second device by encrypting, based on the one or more encryption parameters, the portion of the electronic message.

4. A method as recited in claim 1, wherein:

the particular feature is to compress at least the portion of the electronic message;

the data includes one or more compression parameters; and the modified portion of the electronic message is generated by the second device by compressing, based on the one or more compression parameters, the portion of the electronic message.

5. A method as recited in claim 1, further comprising the computer-implemented steps of:
generating a header that includes the data; and
modifying the electronic message to include the header.

6. A method as recited in claim 1, wherein:
the electronic message is a packet of data; and
the data identifies the portion of the packet based on an offset from an end of the packet.

7. A method as recited in claim 1, wherein:
the particular feature is to encrypt at least the portion of the electronic message based on Internet Protocol security architecture (IPsec);
the first device is a router that includes an input/output processor and a routing processor;
the input/output processor performs the steps of receiving the electronic message, determining whether the data is associated with the electronic message, sending the portion of the electronic message to the second device, receiving from the second device the modified portion of the electronic message, and generating the modified electronic message; and
the routing processor performs the steps of identifying the particular feature and associating the data with the electronic message.

8. A method as recited in claim 1, further comprising the computer-implemented steps of:
receiving, at the first device, an additional electronic message that is associated with one or more additional features that are to be applied to the additional electronic message;
determining whether to apply a particular additional feature of the one or more additional features, wherein the particular additional feature is associated with an additional group of one or more operations that modify at least an additional portion of the electronic message;
when the particular additional feature is determined to be applied, sending at least the additional portion of the additional electronic message to the second device to perform the additional group of one or more operations, thereby generating a modified additional portion of the additional electronic message;
receiving from the second device the modified additional portion of the additional electronic message; and
based on the modified additional portion of the additional electronic message, generating a modified additional electronic message.

9. A method as recited in claim 8, wherein:
the particular feature is to encrypt at least the portion of the electronic message;
the data includes one or more encryption parameters;
the modified portion of the electronic message is generated by the second device by encrypting, based on the one or more encryption parameters, the portion of the electronic message;
the particular additional feature is to decrypt at least the additional portion of the additional electronic message; and
the modified additional portion of the additional electronic message is generated by the second device by decrypting the additional portion of the additional electronic message.

10. A method as recited in claim 1, wherein the particular feature is a first feature, the portion is a first portion, the modified portion is a modified first portion, the group of one or more operations is a first group of one or more operations, the data is first data, the modified electronic message is a modified first electronic message, and the method further comprises the computer-implemented steps of:
while applying the one or more features to the electronic message, identifying a second feature of the one or more features that is associated with a second group of one or more operations that modify at least a second portion of the electronic message;
while applying the second feature, associating second data with the electronic message, wherein the second data indicates that the second group of one or more additional operations has been performed despite the second group of one or more operations not having been performed;
after applying the one or more features, determining whether the second data is associated with the electronic message;
when the second data is determined to be associated with the electronic message, sending the second portion of the electronic message to a third device to perform the second group of one or more operations, thereby generating a modified second portion of the electronic message;
receiving from the third device the modified second portion of the electronic message; and
based on the modified second portion of the electronic message and the modified first electronic message, generating a modified second electronic message.

11. A method as recited in claim 10, wherein the second portion of the electronic message includes the first portion of the electronic message, and the method further comprises the computer-implemented step of:
performing the step of sending the second portion of the electronic message to the third device after the step of receiving from the second device the modified first portion of the electronic message.

12. A method as recited in claim 10, wherein the first data identifies the second data, and the step of determining whether the second data is associated with the electronic message comprises the computer-implemented step of:
based on the first data, determining whether the second data is associated with the electronic message.

13. A method as recited in claim 10, wherein:
the third device is the second device;
the first feature is to encrypt at least the first portion of the electronic message;
the modified first portion of the electronic message is generated by the second device by encrypting the first portion of the electronic message;
the second feature is to encrypt at least the second portion of the electronic message; and
the modified second portion of the electronic message is generated by the second device by encrypting the second portion of the electronic message.

14. A method as recited in claim 10, wherein:
the first feature is to encrypt at least the first portion of the electronic message;
the modified first portion of the electronic message is generated by the second device by encrypting the first portion of the electronic message;
the second feature is to compress at least the second portion of the electronic message; and the modified second portion of the electronic message is generated by the third device by compressing the second portion of the electronic message.

15. A method for virtual encryption of electronic messages in a multiprocessor computing system, the method comprising the computer-implemented steps of:
receiving an electronic message at a first processor of the multiprocessor computing system, wherein the electronic message is associated with one or more features that are to be applied to the electronic message;
the first processor applying a first set of features of the one or more features to the electronic message;
a second processor of the multiprocessor computing system negotiating one or more Internet protocol security (IPsec) parameters with a fourth processor external to said multiprocessor computing system;
said second processor of the multiprocessor computing system applying a second set of features of the one or more features to the electronic message;
while applying the second set of features, the second processor identifying an encryption feature;
while virtually applying the encryption feature, the second processor associating data with the electronic message, wherein the data indicates that a portion of the electronic message has been encrypted, even though the portion actually has not been encrypted, and wherein the data further includes the one or more IPsec parameters;
after the second processor applies the second set of features, the first processor determining whether the data is associated in the electronic message;
when the data is determined to be associated with the electronic message, the first processor sending the portion of the electronic message to a third processor of the multiprocessor computing system, wherein the third processor performs encryption;
receiving, at the first processor from the third processor, an encrypted portion of the electronic message that is based on the portion of the electronic message; and
based on the encrypted portion of the electronic message, the first processor generating a modified electronic message.

16. A method as recited in claim 15, wherein:
the first processor controls the third processor; and
the second processor does not control the third processor.

17. A method as recited in claim 15, wherein the third processor encrypts the portion of the electronic message according to the one or more IPsec parameters.

18. A method as recited in claim 15, further comprising the computer-implemented steps of:
the first processor receiving an additional electronic message, wherein at least an additional portion of the additional electronic message is encrypted;
the first processor sending at least the additional portion of the additional electronic message to the third processor, wherein the third processor performs decryption;
receiving, at the first processor from the third processor, a decrypted additional portion of the additional electronic message;
based on the decrypted additional portion of the additional electronic message, generating a modified additional electronic message; and
the second processor applying at least one additional feature to the modified additional electronic message.

19. A computer-readable medium carrying one or more sequences of instructions for virtual application of features to electronic messages, which instructions, when executed by one or more processors, cause the one or more processors to carry out the steps of:
receiving, at a first device, an electronic message that is associated with one or more features that are to be applied to the electronic message;
while applying the one or more features to the electronic message, identifying a particular feature of the one or more features that is associated with a group of one or more operations that modify at least a portion of the electronic message;
while virtually applying the particular feature, associating data with the electronic message, wherein the data indicates that the group of one or more operations has been performed, although the group of one or more operations actually has not been performed;
after applying the particular feature, applying at least one feature of the one or more features other than the particular feature as if the group of one or more operations has been performed, even though the group of one or more operations actually has not been performed;
after applying the at least one feature of the one or more features, determining whether the data is associated with the electronic message;
when the data is determined to be associated with the electronic message, sending the portion of the electronic message to a second device to perform the group of one or more operations, thereby generating a modified portion of the electronic message based on the portion of the electronic message;
receiving from the second device the modified portion of the electronic message; and
based on the modified portion of the electronic message, generating a modified electronic message.

20. An apparatus for virtual application of features to electronic messages, comprising:
means for receiving an electronic message at a first device, wherein the electronic message is associated with one or more features that are to be applied to the electronic message;
means for identifying a particular feature of the one or more features while applying the one or more features to the electronic message, wherein the particular feature is associated with a group of one or more operations that modify at least a portion of the electronic message;
means for associating data with the electronic message while virtually applying the particular feature, wherein the data indicates that the group of one or more operations has been performed, although the group of one or more operations actually has not been performed;
means for applying at least one feature of the one or more features other than the particular feature as if the group of one or more operations has been performed, even though the group of one or more operations actually has not been performed after applying the particular feature;
means for determining whether the data is associated with the electronic message, after applying the at least one feature of the one or more features;
means for sending the portion of the electronic message to a second device when the data is determined to be associated with the electronic message, wherein the second device performs the group of one or more operations, thereby generating a modified portion of the electronic message based on the portion of the electronic message;

means for receiving from the second device the modified portion of the electronic message; and means for generating a modified electronic message, based on the modified portion of the electronic message.

21. An apparatus for virtual application of features to electronic messages, comprising:

a processor;

one or more stored sequences of instructions which, when executed by the processor, cause the processor to carry out the steps of:

receiving, at a first device, an electronic message that is associated with one or more features that are to be applied to the electronic message;

while applying the one or more features to the electronic message, identifying a particular feature of the one or more features that is associated with a group of one or more operations that modify at least a portion of the electronic message;

while virtually applying the particular feature, associating data with the electronic message, wherein the data indicates that the group of one or more operations has been performed, although the group of one or more operations actually has not been performed;

after applying the particular feature, applying at least one feature of the one or more features other than the particular feature as if the group of one or more operations has been performed, even though the group of one or more operations actually has not been performed;

after applying the at least one feature of the one or more features, determining whether the data is associated with the electronic message;

when the data is determined to be associated with the electronic message, sending the portion of the electronic message to a second device to perform the group of one or more operations, thereby generating a modified portion of the electronic message based on the portion of the electronic message;

receiving from the second device the modified portion of the electronic message; and based on the modified portion of the electronic message, generating a modified electronic message.

22. An apparatus for virtual encryption of electronic messages, comprising:

a first processor that receives an electronic message, wherein the electronic message is associated with one or more features that are to be applied to the electronic message, wherein the first processor applies a first set of features of the one or more features to the electronic message;

a second processor that applies a second set of features of the one or more features to the electronic message, wherein the second processor identifies an encryption feature while applying the second set of features, wherein the second processor associates data with the electronic message while virtually applying the encryption feature, wherein the data indicates that a portion of the electronic message has been encrypted, even though the portion actually has not been encrypted, and wherein the second processor applies a feature of the second set of features other than the encryption feature as if the electronic message has been encrypted;

a third processor that performs encryption;

wherein after the second processor applies the second set of features, the first processor determines whether the data is associated with the electronic message;

wherein the first processor sends the portion of the electronic message to the third processor when the data is determined to be associated with the electronic message;

wherein the first processor receives from the third processor an encrypted portion of the electronic message that is based on the portion of the electronic message; and wherein the first processor generates a modified electronic message, based on the encrypted portion of the electronic message.

* * * * *